United States Patent [19]

MacKenzie et al.

[11] Patent Number: 5,499,372

[45] Date of Patent: Mar. 12, 1996

[54] METHOD OF CONTROLLING ACCESS TO RESTRICTED ACCESS DATA AND COMMUNICATION SYSTEM THEREFOR

[75] Inventors: John R. S. MacKenzie; Bernard P. Collins, both of Surrey, Great Britain

[73] Assignee: Avant Guardian Limited, Surrey, United Kingdom

[21] Appl. No.: 202,908

[22] Filed: Feb. 28, 1994

Related U.S. Application Data

[63] Continuation of Ser. No. 842,167, Jun. 3, 1992, abandoned.

[30] Foreign Application Priority Data

Oct. 5, 1989 [GB] United Kingdom ............... 8922473

[51] Int. Cl.⁶ ..................... G06F 15/00; H04L 9/00
[52] U.S. Cl. ................. 395/725; 395/575; 380/3; 379/95; 340/825.31
[58] Field of Search ............................. 395/725, 575, 395/325; 380/25, 3; 379/95; 340/825.3, 825.31, 825.34

[56] References Cited

U.S. PATENT DOCUMENTS

| | | | |
|---|---|---|---|
| 4,475,175 | 10/1984 | Smith | 395/200 |
| 4,484,306 | 11/1984 | Kulczyckyj et al. | 395/200 |
| 4,596,898 | 6/1986 | Pemmaraju | 178/22.16 |
| 4,604,499 | 8/1986 | Hughes | 379/95 |
| 4,626,623 | 12/1986 | LaHaye | 379/95 |
| 4,638,356 | 1/1987 | Frezza | 358/118 |
| 4,733,345 | 3/1988 | Anderson | 380/25 |
| 4,905,281 | 2/1990 | Surjaatmadja et al. | 380/25 |
| 4,962,449 | 10/1990 | Schlesinger | 395/325 |

Primary Examiner—Glenn A. Auve
Attorney, Agent, or Firm—Sheridan Ross & McIntosh

[57] ABSTRACT

In electronic communication systems, negotiations are performed between two pieces of apparatus (e.g. modems) in order to ensure technical compatibility during subsequent data transmission. Instead of performing security checks in the known manner after the negotiations have been completed (e.g. sending an access code or identity code), the invention teaches that the negotiations themselves should be customized to include security checks. For example, during negotiations between a call modem and an answer modem, the call modem includes a "first indication" in the negotiations. The answer modem detects the "first indication" and permits the call modem to have access to restricted access data during data transmission after the negotiations have been completed. The "first indication" may comprise a negotiation segment having a precise length and/or containing an embedded code. The answer modem may include a "second indication" in the negotiations in order to trigger the call modem to produce the "first indication". Also, the call modem may include a "third indication" in the negotiations after the "first indication" in order to identify more precisely or uniquely the call modem.

16 Claims, 1 Drawing Sheet

5,499,372

METHOD OF CONTROLLING ACCESS TO RESTRICTED ACCESS DATA AND COMMUNICATION SYSTEM THEREFOR

This is a continuation of application Ser. No. 07/842,167, filed Jun. 3, 1992, now abandoned.

FIELD OF THE INVENTION

This invention relates to the controlling of access to restricted access data.

BACKGROUND OF THE INVENTION

With the ever growing use of electronic communication systems, it is necessary to ensure that only authorised users obtain access to restricted access data. For example, a computer may be accessible via the public telephone network by having a modem that links up, via the telephone network, with the modem of a user. Normally, the decision as to whether to permit access to any restricted access data in the computer is determined by whether the user transmits, via the modems, an approved access code or identity code to the computer. However, so-called "hackers" are able by detailed knowledge of existing systems or by persistent guessing of possible identity codes to gain access to restricted access data in computers.

Accordingly, there is the need for an arrangement in which the "hacker" is unaware that he is being vetted as to whether or not he is entitled to access to the restricted access data. Alternatively, if the "hacker" is aware that he is being vetted, he must be unable to work out how to circumvent the security features.

SUMMARY OF THE INVENTION

According to a first aspect of the present invention, a method of enabling a first apparatus to determine whether or not a second apparatus should be permitted access to restricted access data comprises the steps of:

the first an second apparatuses performing joint negotiations to ensure technical compatibility for data transmission between themselves;

the first apparatus monitoring the negotiations to detect whether, within the negotiations, there is a first indication originating from the second apparatus that the first apparatus recognises as indicating that the second apparatus is entitled to access to the restricted access data; and the first apparatus responding if it detects the first indication, whereby the response of the first apparatus may be used to permit the second apparatus to gain access to the restricted access data when data transmission starts after the negotiations have been completed.

If, for example, the first and second apparatuses are answer and call modems respectively, then the negotiations may be the start-up procedure that modems automatically perform without any active participation by the user whose personal computer, for example, is connected to the call modem. Because the user is vetted automatically during the start-up procedure, the user is not aware that his security status is being checked. Start-up procedure negotiations are illustrated in FIG. 4/V.32 of the CCITT Recommendation V.32 relating to "A family of 2-wire, duplex modems operating at data signalling rates of up to 9600 bit/s for use on the, general switched telephone network and on leased telephone-type circuits". Whilst some of the start-up procedure is precisely determined by the V.32 Recommendation, there are certain parts of the procedure where the exact format of the signals is not precisely laid down. It is during such parts of the procedure that the first indication may be included in the start-up negotiations.

Because first indication may be included within existing standard modem procedures, such as the start-up procedure, the present invention may be made compatible with existing modem arrangements.

As it is possible that the first indication might be included in the negotiations by the second apparatus purely by chance, it is preferable that the method further includes the steps of:

the first apparatus including a second indication in the negotiations;

the second apparatus monitoring the negotiations to detect whether, within the negotiations, there is the second indication; and the second apparatus including the first indication in the negotiations only if the second apparatus has already detected the second indication.

Because the first indication is generated in response to the second indication, it is less likely that the second indication will be included in the negotiations purely by chance compared with the arrangement where the first apparatus merely monitors for the presence of the first indication without laving triggered the generation of the first indication by itself producing the second indication. Thus, an extra element of security is included.

It is envisaged that the first indication may, for example, identify the second apparatus as belonging to a group of apparatuses which are permitted access to the restricted access data. For example, the second indication may inform the first apparatus that the second apparatus is an authorised piece of apparatus belonging to company X. However, the first apparatus does not know exactly which of the possibly many. authorised pieces of apparatuses belonging to company X the particular second apparatus it is communicating with happens to be. Thus, it is preferable that the method further includes the step of the second apparatus including a third indication in the negotiations after it has included the first indication in the e negotiations. The third indication may therefore be used to identify more precisely or even uniquely the second apparatus. For example, the third indication could identify the second apparatus as being the piece of apparatus in the Accounts Department within company X. This gives an extra piece of knowledge to the first apparatus which was previously only aware, by virtue of the first indication, that the second apparatus was one of the many authorised apparatuses belonging to company X.

According to a second aspect of the present invention, a communication system comprises:

a first apparatus for controlling access to restricted access data and a second apparatus;

the first and second apparatuses including respective means for performing joint negotiations to ensure technical compatibility for data transmission between the first and second apparatuses;

the second apparatus further including means for including in the negotiations a first indication indicating that the second apparatus is entitled to access to the restricted access data; and the first apparatus further including means for monitoring the negotiations to detect the first indication and means for responding to the detection of the first indication, whereby the response of the first apparatus may be used to permit the second apparatus to gain access to the restricted access data when data tranmission starts after the negotiations have been completed.

Preferably, the first apparatus further includes means for including in the negotiations a second indication, and the second apparatus further includes means for monitoring the negotiations to detect the second indication and means for activating the first indication inclusion means in response to the detection of the second indication.

Preferably, the second apparatus further includes means for including in the negotiations a third indication after the first indication.

BRIEF DESCRIPTION OF THE DRAWINGS

The invention will now be described by way of non-limiting example with reference to the accompanying drawings in which.

DETAILED DESCRIPTION OF THE INVENTION

Figure 1:
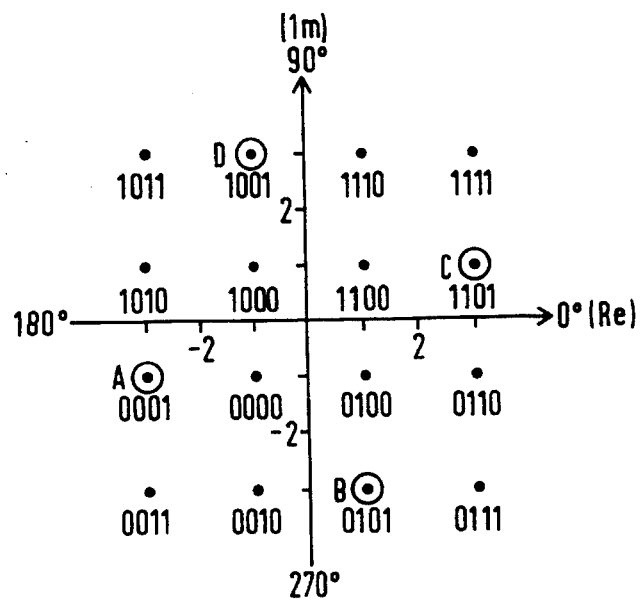
FIG. 1 is a diagram illustrating a 16-point signal structure with non-redundant coding for 9600 bit/s and subset A,B, C,D of states used at 4800 bit/s and for training.
Figure 2:
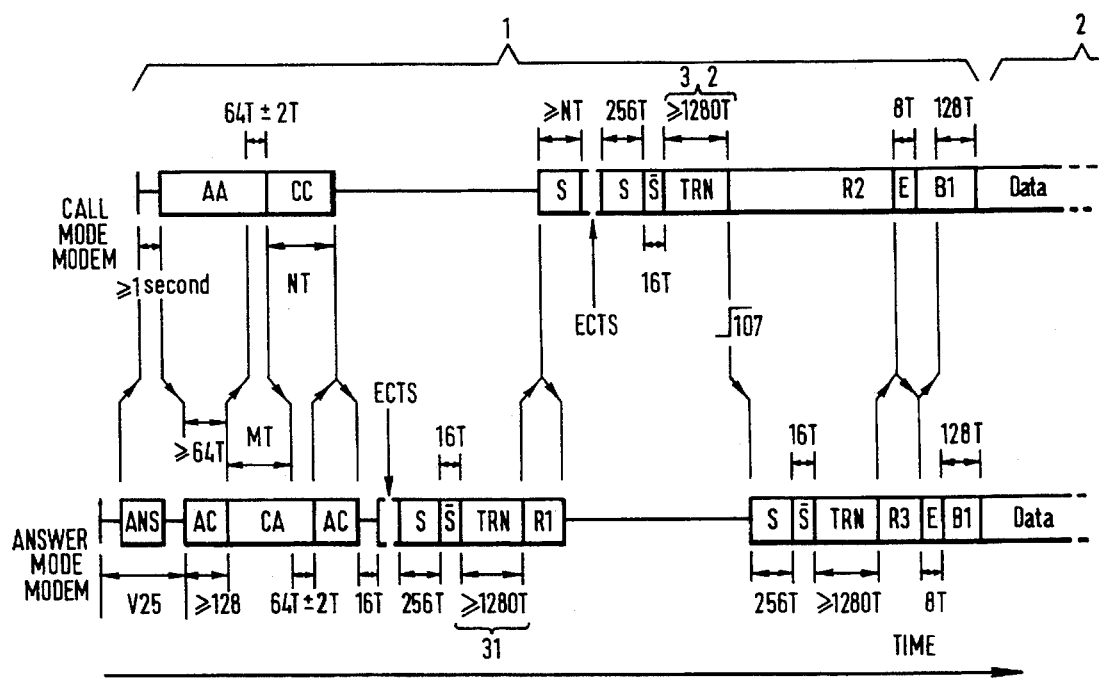
FIG. 2 is a diagram illustrating the start-up procedure negotiations between modems prior to the transmission of data between the modems.

FIGS. 1 and 2 describe an example of the invention in the context of modem to modem communications as described in CCITT Recommendation V.32. A full explanation regarding signal states A,B,C,D as shown in FIG. 1 is given in section 2.4 of Recommendation V.32.

Also a full explanation regarding the start-up procedure negotiations is given in section 5 ("Operating Procedures") of Recommendation V.32.

Referral should be made to Recommendation V.32 in order to achieve a full understanding of the known start-up procedure specification.

However, in order to assist understanding of FIG. 2, there is reproduced below a table identifying the nature of the individual segments identified in FIG. 2.

| | |
|---|---|
| ANS | Answer tone in accordance with CCITT Recommendation V.25. |
| AC | Signal states ACAC..AC for an even number of symbol intervals T; similarly with CA, AA and CC. |
| MT,NT | Round-trip delays observed from answer and call modems respectively, including 64T ± 2T modem turn round delay. |
| S,$\bar{S}$ | Signal states ABAB..AB, CDCD..CD. |
| TRN | Scrambled ones at 4800 bit/s with dibits encoded directly to states A, B, C and D as defined in section 5.2, c) of CCITT Recommendation V.32. |
| R1, R2, R3 | Each a repeated 16-bit rate sequence at 4800 bit/s scrambled and differentially encoded as in TABLE 1 of CCITT Recommendation V.32. |
| E | A single 16-bit sequence marking and following the end of a whole number of 16-bit rate sequences in R2 and R3. |
| B1 | Binary ones scrambled and encoded as for the subsequent transmission of data. |
| ECTS | Optional special echo canceller training sequence. |

This example of the present invention relies on the fact that Recommendation V.32 does not specify precisely all features of the negotiations labelled 1 in FIG. 2 that occur prior to data transmission 2. The negotiations 1 comprise the start-up procedure between the call and answer modems.

The negotiations 1 include segments 31 and 32 of a type called TRN which serve to train the adaptive equaliser in the receiving modem and the echo canceller in the transmitting modem. As may be seen from FIG. 2, recommendation V.32 specifies that the TRN segments must be greater than or equal to 1280 symbol intervals T. A symbol interval T is the interval associated with one of the signal states A,B,C or D as shown in FIG. 1. Also, Recommendation V.32 only specifies the nature of the first 256 symbols. There is therefore leeway as to exactly which symbols are selected to be the 257the symbol onwards and exactly how many symbols there should be, subject to the requirement that the total number of symbols associated with segment TRN is greater than or equal to 1280.

Thus, an indication may be given by choosing the total number of symbols to be a precise number, for example, 2036 symbols.

Thus, TRN segment 32 may be carefully arranged to provide the "first indication" of the present invention. TRN segment 32 has to be present in accordance with Recommendation V.32 but it is by choosing its parameters within the possibilities allowed by the Recommendation that it may be made to serve the purpose of the "first indication". This may be done by, as mentioned above, arranging for TRN segment 32 to have a precise symbol length. Alternatively, because the symbols from the 257th symbol onwards are unspecified, it may be arranged that within the TRN segment 32, after the 257the symbol, there is a predetermined code of the symbols A,B,C,D which the answer modem identifies as being the "first indication". Such a predetermined code of symbols may be likened to a gene contained within a chromosome.

Including such a code in TRN segment 32 will require the scrambler in the call modem to be returned to a known condition consistent with the state of the descrambler in the answer modem. Scrambler/descramblers are discussed section 4 of Recommendation V.32.

Prior to the "first indication" being included in the start-up procedure negotiations by the call modem by customizing the characteristics of the TRN segment 32, the answer modem produces its own customized TRN segment 31, which serves as a "second indication". The call modem monitors for the presence of the customized TRN segment 31 and only produces its own customized TRN segment 32 if it detects the presence of customized TRN segment 31. If the TRN segment 31 is not correctly customized (i.e. no "second indication" is present), then the call modem will produce a TRN segment 32 that does not contain the "first indication", e.g. by giving the segment a length of 2500 symbols or ensuring that it does not contain the predetermined code of the symbols A,B,C,D.

The customized TRN segment 31 may therefore be likened to a "nod" that is produced by the answer modem and which triggers off the production of a "wink" by the call modem in the form of the customized TRN segment 32.

The customized TRN segment 32 may in practice be capable of being produced by a large number of modems and thus, when the answer modem receives the customized TRN segment 32, it is unable to identify precisely which modem it is connected to.

Therefore, the call modem produces a "third indication" that is used to identify precisely which modem it is. The "third indication" is produced by the call modem after it has produced the "first indication". If the "first indication" is in the form of a predetermined code of signal states A,B,C,D embedded within TRN segment 32, then the "third indication" may also comprise a predetermined code of signal states A,B,C,D appearing in the TRN segment 32, but after the "first indication".

In the context of modems, it is envisaged that the present invention rosy be implemented by modifying standard modems that are in accordance with Recommendation V.32. These modems, because they remain in accordance with Recommendation V.32, are capable of working normally without providing a security checking function. However, order to achieve such a security function, the modems will contain additional circuitry over and above that required to satisfy Recommendation V.32 so as to to provide the first, second and third indications and to respond thereto. Thus, additional circuitry in the answer modem will, upon detecting the first indication, produce a response (e.g. a signal) which permits the data transmission 2 subsequent to the start-up procedure negotiations 1 to involve the restricted access data. In simple terms, the signal produced by the answer modem may, for example, activate a switch so that a computer database accessed via the answer modem permits the, for example, personal computer connected to the call modem to have access only to non-restricted data if the signal produced in response to the first indication is not present, but to have access to the restricted access data if the signal produced in response to the first indication is present.

It is to be understood that the present invention is not restricted to implementation in the context of modems. For example, a pair of computers might be connected by dedicated telephone lines and it is desirable that, every time they communicate with one another, they check that they are indeed authorised to pass restricted access data between themselves. Thus, there may be hardware or software within the computers which, during the negotiations involved prior to data transmission, effect the incorporation and detection of at least the first indication in the negotiations in order to ensure security.

The third indication, instead of being included within the TRN segment 32, could, for example, be incorporated within additional negotiations which are not shown in FIG. 2. For example, after the start-up procedure negotiations 1, there could be additional negotiations associated with error correction and/or data compression which occur after the start-up procedure negotiations 1 but before data transmission 2. The third indication could therefore be incorporated in the error correction and/or data compression negotiations.

What is claimed is:

1. A method of enabling a first apparatus to determine whether or not a second apparatus should be permitted access to restricted access data, said method comprising the steps of:

the first and second apparatuses performing joint negotiations to ensure technical compatibility for subsequent data transmission between themselves, the negotiations being in accordance with an industry, standard protocol;

the first apparatus monitoring the negotiations to detect whether, within the negotiations, there is a first indication which originates from the second apparatus and is not specified by the protocol, and which the first apparatus recognizes as indicating that the second apparatus is entitled to access to the restricted access data; and the first apparatus responding if it detects the first indication, whereby the response of the first apparatus may be used to permit the second apparatus to gain access to the restricted access data when data transmission starts after the negotiations have been completed.

2. A method according to claim 1, further including the steps of:

the first apparatus including in the negotiations a second indication which is not specified by the protocol;

the second apparatus monitoring the negotiations to detect whether, within the negotiations, there is the second indication; and the second apparatus including the first indication in the negotiations only if the second apparatus has already detected the second indication.

3. A method according to claim 2, further including the step of the second apparatus including, in the negotiations after it has included the first indication in the negotiations, a third indication which is not specified by the protocol.

4. A method according to claim 3, wherein the first indication identifies the second apparatus as belonging to a group of apparatuses which are entitled to access to the restricted access data and the third indication identifies the second apparatus more precisely than the first indication.

5. A method according to claim 1, further including the step of the second apparatus including, in the negotiations after it has included the first indication in the negotiations, a third indication which is not specified by the protocol.

6. A method according to claim 5, wherein the first indication identifies the second apparatus as belonging to a group of apparatuses which are entitled to access to the restricted access data and the third indication identifies the second apparatus more precisely than the first indication.

7. A method according to claim 1, wherein the first and second apparatuses are answer and call modems, respectively.

8. A method according to claim 1, wherein the first apparatus responds, if it does not detect the first indication within the negotiations, by permitting the second apparatus to gain access only to non-restricted data when data transmission starts after the negotiations have been completed.

9. A communication system comprising:

a first apparatus for controlling access to restricted access data; and a second apparatus operatively connectable to the first apparatus;

the first and second apparatuses including respective means for performing joint negotiations in accordance with an industry-standard protocol to ensure technical compatibility for subsequent data transmission between the first and second apparatuses;

the second apparatus further including means for including in the negotiations a first indication which is not specified by the protocol and which indicates that the second apparatus is entitled to access to the restricted access data; and the first apparatus further including means for monitoring the negotiations to detect the first indication and means for responding to the detection of the first indication, whereby the response of the first apparatus may be used to permit the second apparatus to gain access to the restricted access data when data transmission starts after the negotiations have been completed.

10. A communication system according to claim 9, wherein the first apparatus further includes means for including in the negotiations a second indication which is not specified by the protocol, and the second apparatus further includes means for monitoring the negotiations to detect the second indication and means for activating the first indication inclusion means in response to the detection of the second indication.

11. A communication system according to claim 10, wherein the second apparatus further includes means for including in the negotiations, after the first indication, a third indication which is not specified by the protocol.

12. A communication system according to claim 9, wherein the second apparatus further includes means for including in the negotiations, after the first indication, a third indication which is not specified by the protocol.

13. A communication system according to claim 9, wherein the first and second apparatuses are answer and call modems, respectively.

14. A communication system according to claim 9, wherein the first apparatus further includes means for responding, if the first apparatus does not detect the first indication within the negotiations, by permitting the second apparatus to gain access only to non-restricted data when data transmission starts after the negotiations have been completed.

15. A method of enabling a first apparatus to determine whether or not a second apparatus should be permitted access to restricted access data, said method comprising the steps of:

the first and second apparatuses performing a compatibility exchange, in accordance with a predetermined protocol for facilitating the exchange, to ensure technical compatibility for subsequent data transmission between themselves, the predetermined protocol defining a protocol time period extending from a first time to a second time, wherein the compatability exchange includes a communication between the first and second apparatuses of information relating to at least one communication parameter for allowing the subsequent data transmission;

the first apparatus monitoring communications from the second apparatus during the protocol time period to detect whether there is a first indication which originates from the second apparatus and is not specified by the predetermined protocol and which the first apparatus recognizes as indicating that the second apparatus is entitled to access to the restricted access data, the first indication occurring between the first time and the second time; and the first apparatus responding if it detects the first indication, whereby the response of the first apparatus may be used to permit the second apparatus to gain access to the restricted access data when data transmission starts after the protocol time period.

16. A method according to claim 15 wherein the step of performing a compatability exchange includes a communication between the first and second apparatuses of information relating to a data transmission rate or data transmission format.

* * * * *